US008179314B2

(12) United States Patent
Kusyk

(10) Patent No.: US 8,179,314 B2
(45) Date of Patent: May 15, 2012

(54) ENHANCED CALIBRATION FOR MULTIPLE SIGNAL PROCESSING PATHS IN A FREQUENCY DIVISION DUPLEX SYSTEM

(75) Inventor: Richard Glenn Kusyk, Ottawa (CA)

(73) Assignee: Reverb Networks, Inc., Ashburn, VA (US)

( * ) Notice: Subject to any disclaimer, the term of this patent is extended or adjusted under 35 U.S.C. 154(b) by 179 days.

(21) Appl. No.: 12/603,907

(22) Filed: Oct. 22, 2009

(65) Prior Publication Data

US 2011/0095944 A1 Apr. 28, 2011

(51) Int. Cl.
*H01Q 3/00* (2006.01)

(52) U.S. Cl. ........................................................ 342/368

(58) Field of Classification Search .................. 342/368, 342/174, 464

See application file for complete search history.

(56) References Cited

U.S. PATENT DOCUMENTS

| | | | | |
|---|---|---|---|---|
| 5,155,590 | A | 10/1992 | Beyers, II et al. | |
| 5,617,101 | A | 4/1997 | Maine et al. | |
| 6,124,824 | A | 9/2000 | Xu et al. | |
| 6,195,045 | B1 | 2/2001 | Xu et al. | |
| 6,208,287 | B1 | 3/2001 | Sikina et al. | |
| 6,600,445 | B2 | 7/2003 | Li | |
| 6,690,952 | B2 | 2/2004 | Nishimori et al. | |
| 6,747,594 | B2 | 6/2004 | Lindskog et al. | |
| 6,765,529 | B2 * | 7/2004 | Doi et al. | 342/368 |
| 7,003,310 | B1 * | 2/2006 | Youssefmir et al. | 455/522 |
| 7,043,199 | B2 | 5/2006 | Dai et al. | |
| 7,098,847 | B2 | 8/2006 | Li | |
| 7,359,734 | B2 | 4/2008 | Ylitalo | |
| 2004/0120411 | A1 | 6/2004 | Walton et al. | |
| 2004/0266483 | A1 | 12/2004 | Choi | |
| 2006/0019712 | A1 | 1/2006 | Choi | |
| 2006/0232332 | A1 | 10/2006 | Braithwaite | |

(Continued)

FOREIGN PATENT DOCUMENTS

EP 1 513 271 3/2005

(Continued)

OTHER PUBLICATIONS

International Search Report dated Sep. 21, 2010 in International (PCT) Application No. PCT/US2010/40573.

(Continued)

*Primary Examiner* — Thomas Tarcza
*Assistant Examiner* — Nga X Nguyen

(57) ABSTRACT

Calibrating signal processing paths for a plurality of transmission devices by obtaining calibration data for at least one of the signal processing paths for each of the transmission devices and determining a plurality of calibration weights from the calibration data for each of the transmission devices. A calibration variance is calculated between the plurality of calibration weights and it is determined if the calibration variance is below a calibration variance threshold. Additionally, a phase variation and a magnitude variation are calculated from the calibration data for each of the transmission devices and it is determined for each of the transmission devices if the phase variation is below a phase variation threshold and if the magnitude variation is below a magnitude variation threshold. Further, if the calibration variance is below the calibration variance threshold, and the phase variation is below the phase variation threshold and the magnitude variation is below the magnitude variation threshold for each of the transmission devices, then the plurality of calibration weights are applied to the at least one of the signal processing paths of each of the transmission devices.

20 Claims, 10 Drawing Sheets

U.S. PATENT DOCUMENTS

| | | | | |
|---|---|---|---|---|
| 2007/0109995 | A1 | 5/2007 | Quigley et al. | |
| 2007/0249404 | A1 | 10/2007 | Gao et al. | |
| 2007/0298733 | A1 | 12/2007 | Cole et al. | |
| 2008/0090531 | A1 | 4/2008 | Jungerman et al. | |
| 2010/0013709 | A1 * | 1/2010 | Schlee et al. | 342/372 |
| 2011/0022904 | A1 | 1/2011 | Zopf et al. | |
| 2011/0068971 | A1 * | 3/2011 | Kusyk | 342/174 |

FOREIGN PATENT DOCUMENTS

| | | |
|---|---|---|
| WO | 2008/009421 | 1/2008 |

OTHER PUBLICATIONS

International Search Report issued Nov. 15, 2010 in International (PCT) Application No. PCT/US2010/049083.

* cited by examiner

ENHANCED CALIBRATION FOR MULTIPLE SIGNAL PROCESSING PATHS IN A FREQUENCY DIVISION DUPLEX SYSTEM

BACKGROUND OF THE INVENTION

1. Field of the Invention

The present invention relates generally to the field of signal processing, and more specifically to calibration of multiple signal processing paths within a wireless network.

2. Description of the Related Art

A signal processing system, in for example a Frequency Division Duplex ("FDD") system, includes a plurality of signal processing paths and requires a suitable mechanism to match characteristics of the individual signal processing paths to each other within a given pre-specified tolerance. Each of the signal processing paths also includes a transmitter (Tx) and/or a receiver (Rx) or an electrical/electronic/optical measurement system that allows an information/measurement signal with or without modulating a carrier to be processed through it. It is necessary for the plurality of processing paths to have electrical parameters of, for example, magnitude, phase and bulk delay through the individual processing paths to match each other within an acceptable tolerance, which may be different for the different processing paths.

Beamforming is a general signal processing technique used to control the directionality of the reception or transmission of a signal on a transducer array. Using beamforming, the majority of signal energy can be transmitted from a group of transducers (such as radio antennas) in a chosen angular direction. The present invention discloses a beamforming calibration system for use in a FDD system for matching characteristics of the individual signal processing paths to each other within a given pre-specified tolerance.

SUMMARY OF THE INVENTION

An embodiment of the invention relates to a method of calibrating signal processing paths for a plurality of transmission devices. The method includes obtaining calibration data for at least one of the signal processing paths and determining a plurality of calibration weights from the calibration data for each of the transmission devices. A calibration variance is calculated between the plurality of calibration weights and it is determined if the calibration variance is below a calibration variance threshold. Additionally, a phase variation and a magnitude variation are calculated from the calibration data for each of the transmission devices and it is determined for each of the transmission devices if the phase variation is below a phase variation threshold and if the magnitude variation is below a magnitude variation threshold. Further, if the calibration variance is below the calibration variance threshold, and the phase variation is below the phase variation threshold and the magnitude variation is below the magnitude variation threshold for each of the transmission devices, then the plurality of calibration weights are applied to at least one of the signal processing paths of each of the transmission devices.

DETAILED DESCRIPTION OF THE INVENTION

Figure 1:
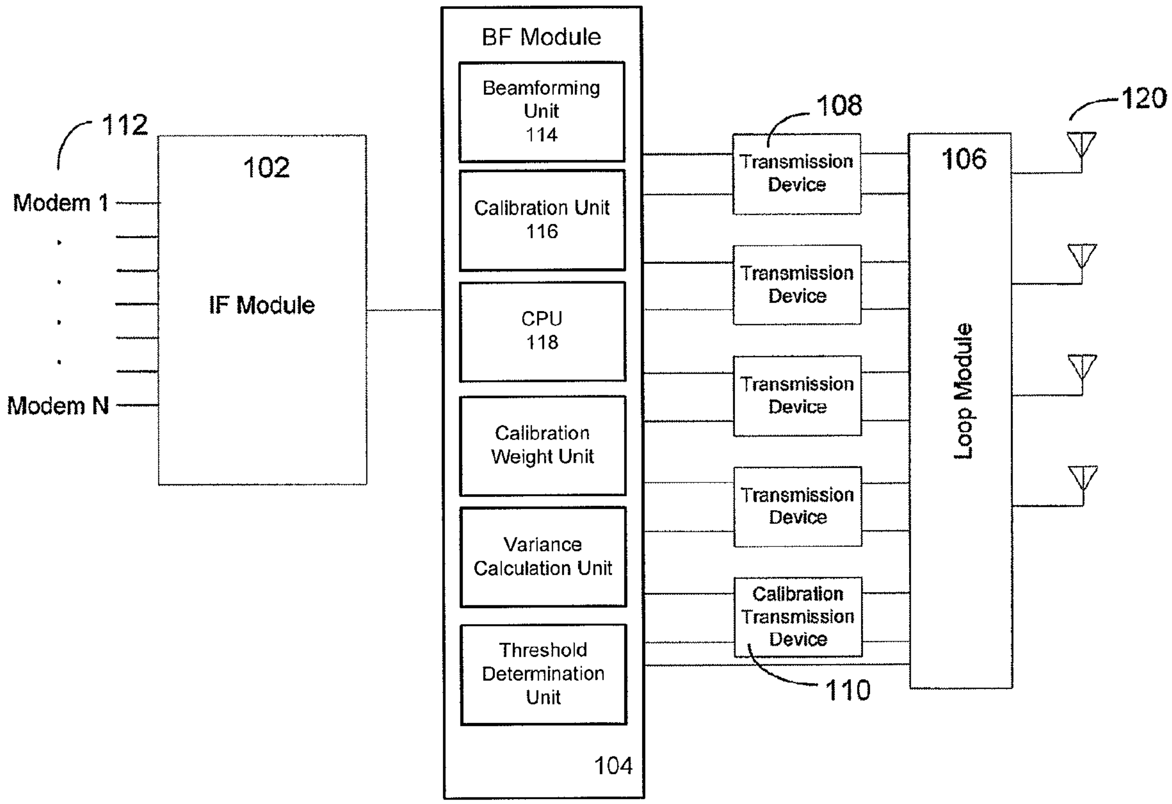
FIG. 1 is a block diagram illustrating an exemplary calibration system in accordance with an embodiment of the present invention.

FIG. 1 illustrates an exemplary system for carrying out an embodiment of the present invention. Broadly, the system includes an interface (IF) module 102, a beamforming (BF) module 104, two or more transmission devices 108, a loop module 106, and two or more antennas 120.

The IF module 102 is used to interconnect the system with one or more modems 112. Each type of modem will require a unique IF module 102 that is specifically designed to handle the unique interface and signaling requirements. The modems 112 are able to control the signal processing paths of the transmission devices 108. The signal processing paths include both the Tx power output and Rx gain of the transmission devices 108. Because the transmission devices 108 are used to carry signals from all the modems 112 simultaneously, control of the Tx power output and Rx gain cannot be accomplished by adjusting each transmission device output power and gain control. Instead, each of the transmission devices 108 is set to maximum Tx power and maximum Rx gain, and beamforming weights are applied to the system to obtain precise Tx power output control and Rx gain control for each transmission device 108. Ideal beamforming weights are transmitted from the modems 112 to the IF module 102. The IF module 102 is used to up-convert and down-convert signals from the modems 112 into a 30 MHz bandwidth that is used by the system and then the signals, including the ideal beamforming weights, are transmitted to the BF module 104.

The BF module 104 is used to perform the main beamforming function including the calibration of the transmission devices 108. The BF module includes a beamforming unit 114, a calibration unit 116, and a central processing unit (CPU) 118.

The BF module 104 performs the multiply-accumulate functions necessary to control the Tx power output and Rx gain control of each of the transmission devices 108. In the downlink direction, the BF module communicates with the modems 112 via the IF module 102 by means of 16-bit digital IF signal running at 60 MSamples/s. This digital signal is digitally down-converted to produce a baseband 32-bit i and q signal. This baseband 32-bit i and q signal is fed into the beamforming unit to produce a 32 bit i and q signal for each of the transmission devices 108. These 32 bit i and q signals are sent out of the BF module 104 to the transmission devices 108 at a rate of 60 MSamples/s.

In the uplink direction, the BF module 104 receives 32-bit i and q signals from each of the transmission devices 108. These signals are fed into the beamforming unit 114 and will produce a 32 bit i and q signal for each of the modems 112. The signals are then digitally up-converted producing a 16-bit IF signal at 60 MSamples/s that is sent to modems 112 via the IF module 102.

A calibration signal is created in the calibration unit 116. The calibration signal is used to create an in-band signal used for calibration of delays through the transmission devices 108. Calibration data is obtained by transmitting the calibration signal through each of the transmission devices 108 and looping it back to the calibration transmission device 110, or transmitting the calibration signal through the calibration device 110 and looping it back through each of the transmission devices 108. The received calibration data is processed by the CPU 118 to ensure the received calibration data is of good quality and to create calibration weights. After calibration weights are obtained, the beamforming unit 114 creates beamforming weights by combining the ideal beamforming weights with the calibration weights and the beamforming unit 114 applies the beamforming weights to the system.

Two or more transmission devices 108 are present in the system. FIG. 1 depicts the system as having four transmission devices 108 though it should be readily understood that any number of two or more transmission devices 108 may be used. The transmission devices 108 provide the Frequency Division Duplex (FDD) channels used for beamforming and a calibration device 110 provides an additional channel used for calibration by sending and receiving a calibration signal that can be used to measure the differences between the transmission devices 108.

In FDD systems, the transmitter and receiver operate at different frequencies. Additionally, there is no gap in the transmission and reception of data and, therefore, the calibration signal needs to be sent out at the same time as the data is being transmitted and received. Further, during the calibration process, the system must meet regulatory requirements. Specifically, the regulatory spectral emission mask specifications must be met in the transmit direction and spurious emission specifications must be met in the receive direction.

The loop module 106 is used to loop RF signals from the one of the transmission devices 108 to the calibration transmission unit 110. The BF module 104 uses a calsel signal 310 to control the loop module 106 to determine which one of the transmission devices' 108 RF signals are looped to the calibration device 110 or vice versa. The loop module 106 must be carefully designed so as not to significantly impact differential phases of the multiple phase paths.

Figure 2:
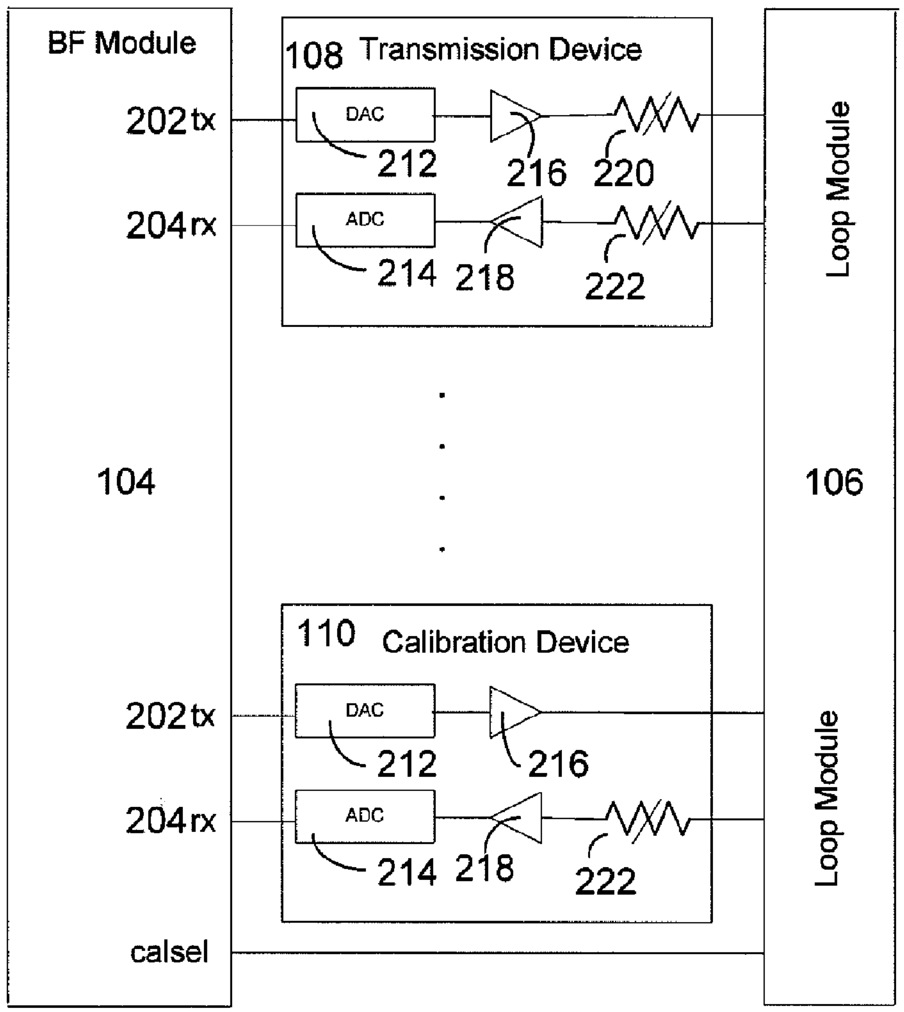
FIG. 2 is a block diagram illustrating the detail of the transmission devices and their interconnections with a beamforming module and a loop module in accordance with an embodiment of the present invention.

Referring now to FIG. 2, FIG. 2 is a block diagram illustrating the transmission devices 108 and the calibration transmission device 110. Along the Tx path 202, the transmission devices 108 have a digital-to-analog (DAC) converter 212 to convert digital baseband i and q signals to radio frequency (RF) signals at a specified RF frequency. The RF signals are fed into filters 216 and an adjustable attenuator 220 before being transmitted to the loop module 106. Conversely along the Rx path 204 of the transmission devices 108, RF signals received from the loop module 106 are passed through an adjustable attenuator 220 and filters 218 before being inputted into an analog-to-digital (ADC) converter 214 to convert the RF signals to digital baseband i and q signals before being transmitted to the BF module 104. The Tx path 202 of the calibration transmission device is similar to the Tx path 202 of the transmission devices except there is no adjustable attenuator 220 and the Tx path 202 of the calibration transmission device operates in the same frequency band as the Rx path 204 of the transmission devices. Additionally, the Rx path 204 of the calibration transmission device 110 is similar to the Rx path 204 of the transmission devices except the Rx path 204 of the calibration transmission device operates in the same frequency band as the Tx path 202 of the transmission devices.

Figure 3:
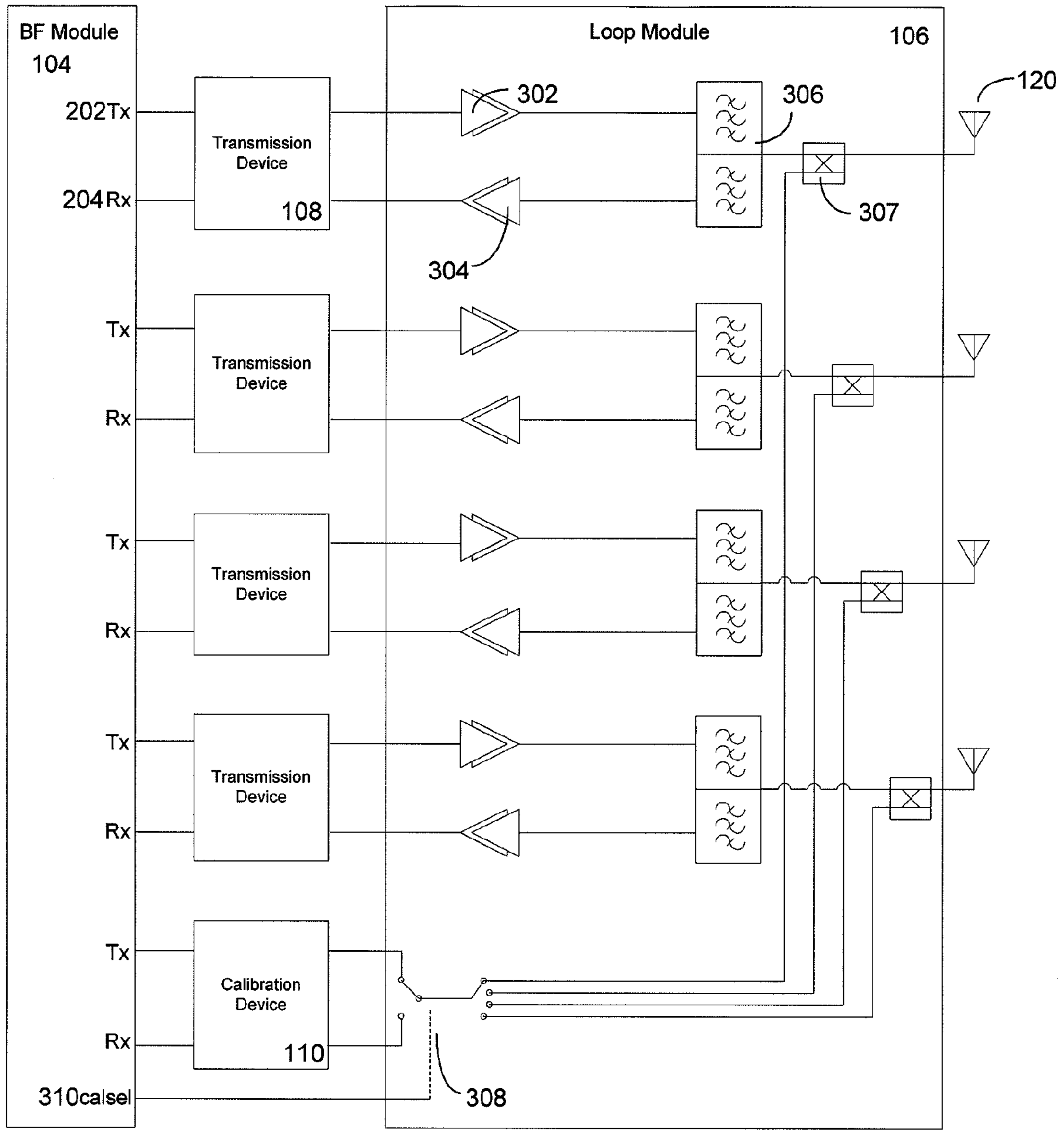
FIG. 3 is a block diagram illustrating the detail of the loop module and its interconnections with a beamforming module and two or more transmission devices in accordance with an embodiment of the present invention.

Referring now to FIG. 3, FIG. 3 is a block diagram illustrating the interconnections between the BF module 104, the transmission devices 108, the calibration device 110, the loop module 106, and the antennas 120. For each of the transmission devices 108 along the Tx path 202, RF signals pass through a power amplifier 302 before entering a diplexer 306 connected to the antennas 120. Conversely, along the Rx path 204, RF signals leave the diplexer 306 connected to the antennas 120 before entering a low noise amplifier 304. A calsel signal 310 is used by the loop module to control a switch 308 to select whether the calibration transmission device 110 receives RF signals from one of the transmission devices 108 or transmits RF signals to one of the transmission devices 108 by means of directional couplers 307.

Figure 4:
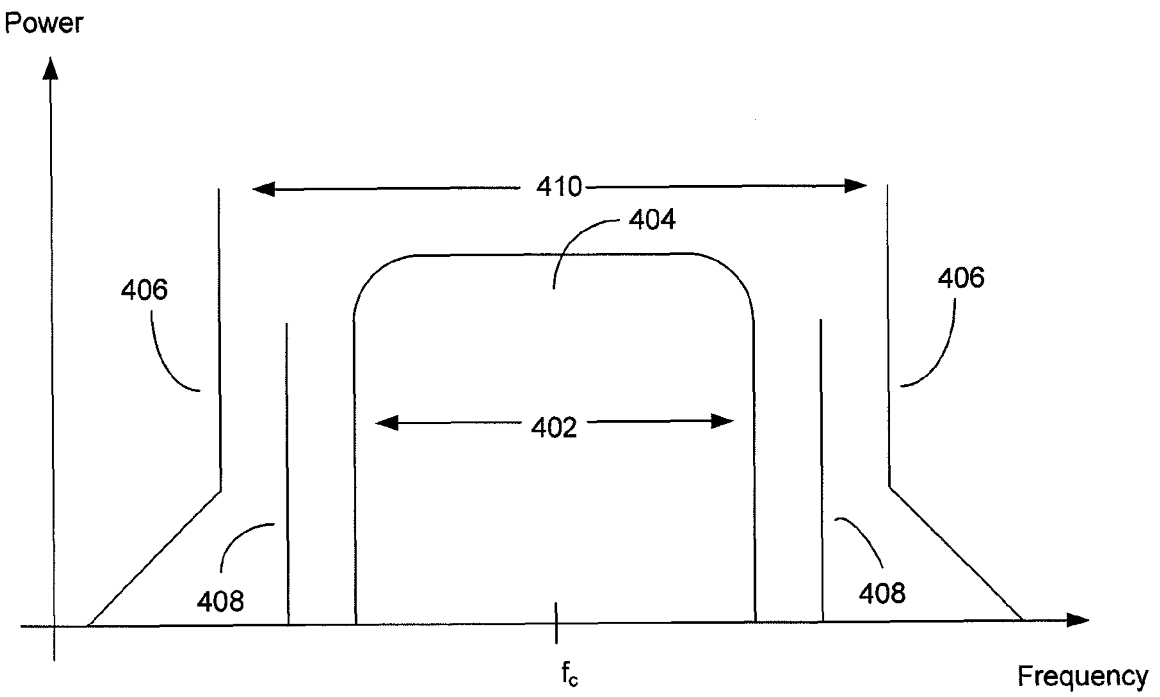
FIG. 4 is a representation of a channel bandwidth of a spectrum allotted to a carrier, and a carrier and calibration tones within the channel bandwidth.

FIG. 4 is a representation of a channel bandwidth 410 of a spectrum allotted to a carrier 404 and calibration tones 408 inserted in the channel bandwidth 410. The channel bandwidth 410 is the amount of spectrum that is allocated for the carrier 404. The channel bandwidth 410 is typically regulated by a regulating body, such as the Federal Communication Commission ("FCC"), based on the type of signal being transmitted and, as such, a carrier 404 must conform to a spectral emission mask 406. For example, a Universal Mobile Telecommunications System ("UMTS") signal would be assigned a frequency band to operate in by the FCC and, additionally, would have to adhere to a prescribed channel bandwidth within the assigned frequency band. A typical channel bandwidth for a UMTS signal is 5 MHz. A spectral mask 406 is illustrated in the figure to define the boundaries of the channel bandwidth 410. As shown, the carrier bandwidth 402 of the carrier 404 is typically less than that of the channel bandwidth 410.

A pair of calibration tones 408 comprising the calibration signal are inserted in the spectrum between the edges of the carrier bandwidth 402 and the channel bandwidth 410. The bandwidth of the calibration tones 408 must be narrow enough to fit within the gap in the spectrum between the channel bandwidth 410 and the carrier bandwidth 402. The carrier 404 and the calibration tones 408 are produced as digital signals within the system at a fixed sampling rate. The bandwidth of the calibration tones 408 is determined based on the finite transmit time of the calibration tones 408. The bandwidth of the calibration tones 408 can be approximately be determined by Equation (1), in which $BW_{caltone}$ is the bandwidth of the calibration tones 408, $f_s$ is the sample rate, and N is the length of the calibration tones.

$$BW_{caltone} \approx \frac{f_s}{N} \quad \text{Equation (1)}$$

Additionally, because the bandwidth of the calibration tones 408 must be narrow enough to fit within the gap in the spectrum between the channel bandwidth 410 and the carrier bandwidth 402, the bandwidth of the carrier 402 can be represented by Equation (2), in which $BW_{channel}$ is the channel bandwidth 410 and $BW_{carrier}$ is the bandwidth of the carrier 402.

$$BW_{caltone} << \frac{1}{2}\cdot(BW_{channel} - BW_{carrier}) \qquad \text{Equation (2)}$$

Combining Equation 1 and Equation 2, the length of the bandwidth of the calibration tones 408 can be readily determined and is represented by Equation (3).

$$N >> \frac{2f_s}{BW_{channel} - BW_{carrier}} \qquad \text{Equation (3)}$$

As noted above, the calibration tones 408 consist at two frequencies within the gaps in the spectrum between the channel bandwidth 410 and the carrier bandwidth 402. In determining the calibration tones 408, a Hamming window is used to minimize the spectral leakage of the calibration tones 408. The calibration tones 408 are determined by Equation 4, in which n=[0, 1, . . . N−1}, A is the amplitude of the calibration tones 408, and $k_L$ and $k_R$ are the left and right indexes of the calibration tones 408, and are determined by Equation (5) and Equation (6), respectively, where $f_c$ is the center frequency of the carrier 404.

$$calibrationsignal(n) = A\cdot\left\{0.54 - 0.46\cos\left[\left(\frac{2\pi n}{N}\right)\right]\cdot\left\{\exp\left(\frac{j2\pi nk_L}{N}\right) - \exp\left(\frac{j2\pi nk_R}{N}\right)\right\}\right] \qquad \text{Equation (4)}$$

$$k_L = \text{round}\left\{\left(f_c - \frac{BW_{channel} + BW_{carrier}}{4}\right)\cdot\frac{N}{f_s}\right\} \qquad \text{Equation (5)}$$

$$k_R = \text{round}\left\{\left(f_c + \frac{BW_{channel} + BW_{carrier}}{4}\right)\cdot\frac{N}{f_s}\right\} \qquad \text{Equation (6)}$$

The amplitude of the calibration tones 408, A, is chosen such that the calibration tones 408 are smaller than the carrier 404 and, as a result, will not significantly impact the power that is transmitted or the Peak-to-Average Power Ratio (PAR) of the combination of the carrier 404 and the calibration tones 408 within the channel bandwidth 410. The amplitude, A, for the calibration tones 408 may be different if the carrier 404 is an uplink carrier or if the carrier 904 is a downlink carrier.

Figure 5:
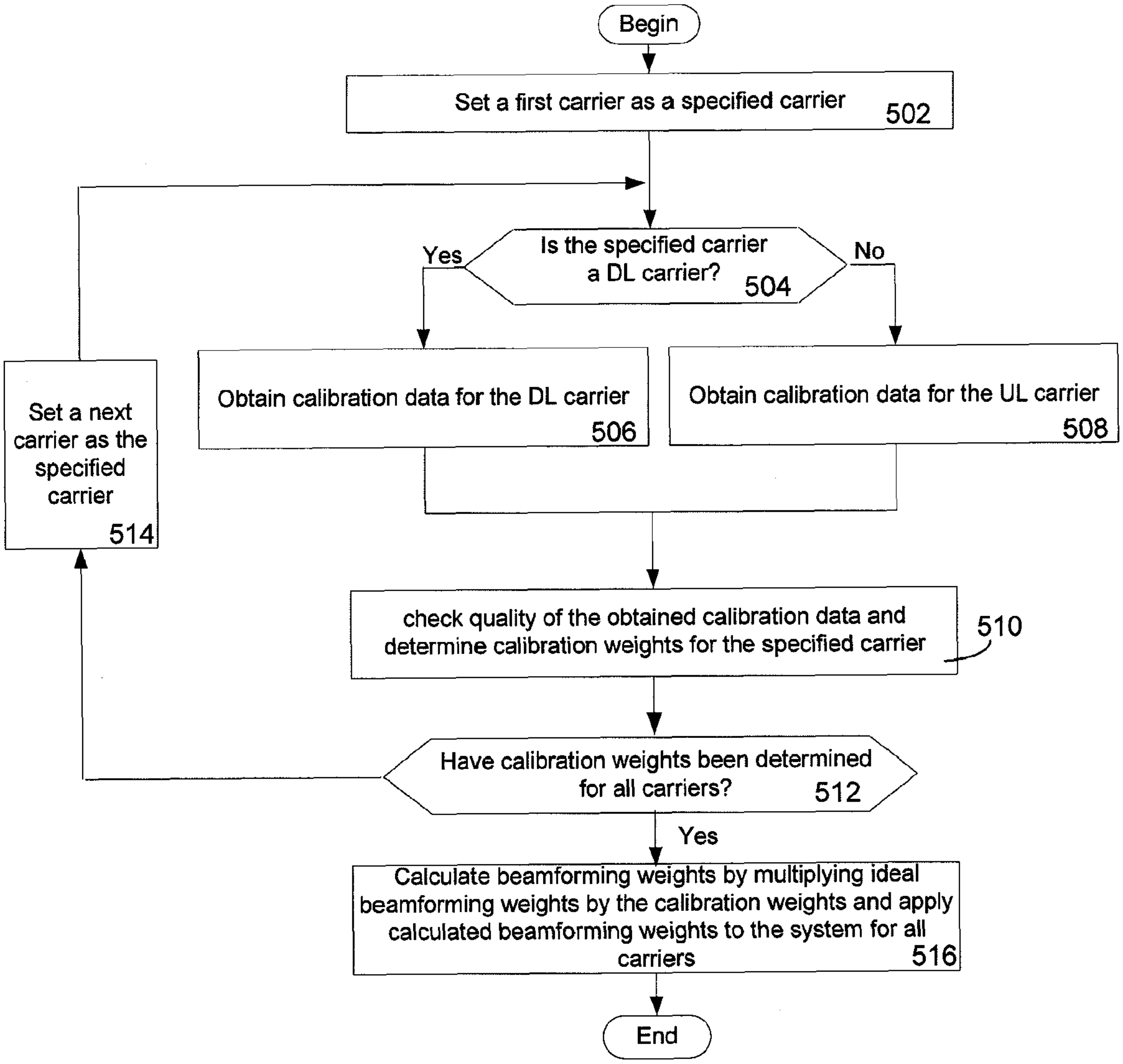
FIG. 5 is a flowchart illustrating a method of obtaining of calibration data from each of two or more transmission devices for each carrier in accordance with an embodiment of the present invention.

Referring now to FIG. 5, FIG. 5 illustrates a flowchart describing a method of obtaining calibration data from each of the transmission devices 108 for each carrier. Beamforming requires the accurate control of the phase and amplitude of the signals to and from the antennas 120. In order to achieve this accuracy, the transmission devices 108 are calibrated so that the differences in phase and amplitude between them can be compensated for. The calibration transmission device 110 is used to send and receive a calibration signal that can be used to measure the differences between the active transmission devices.

In Step 502, a carrier is set as a specified carrier.

In Step 504, it checked to see if the specified carrier is an uplink carrier or a downlink carrier. If the specified carrier is determined to be a downlink carrier, calibration data for the downlink carrier is obtained in Step 506. If the specified carrier is determined to be an uplink carrier, calibration data for the uplink carrier is obtained in Step 508. Steps 506 and 508 will be discussed in more detail in reference to FIG. 6 and FIG. 7, respectively.

In Step 510, the CPU 118 checks the quality of the obtained calibration data and determines calibration weights for each of the transmission devices for the specified carrier, and stores the calculated calibration weights in the calibration unit 116. Step 510 will be discussed in more detail in reference to FIGS. 8 and 9.

In Step 512, the method checks to see if calibration weights have been determined for all carriers. If not, in Step 514, a next carrier is set as the specified carrier and the method returns to Step 504. If calibration weights have been determined for all carriers, in Step 516, the beamforming unit 114 determines beamforming weights for the system by multiplying ideal beamforming weights received from the modems 112 by the calculated calibration weights stored in the calibration unit 116. The beamforming weights are applied to the Tx/Rx paths by the BF module 104.

It should be noted that the calibration process should be performed in a manner such that it is robust to single failures of any one Tx and/or Rx chain. The process should be able to identify which chain, if any, has failed. Additionally, a failed transmission device should not be used as a reference transmission device and the SNR should not be checked for a failed transmission device.

Figure 6:
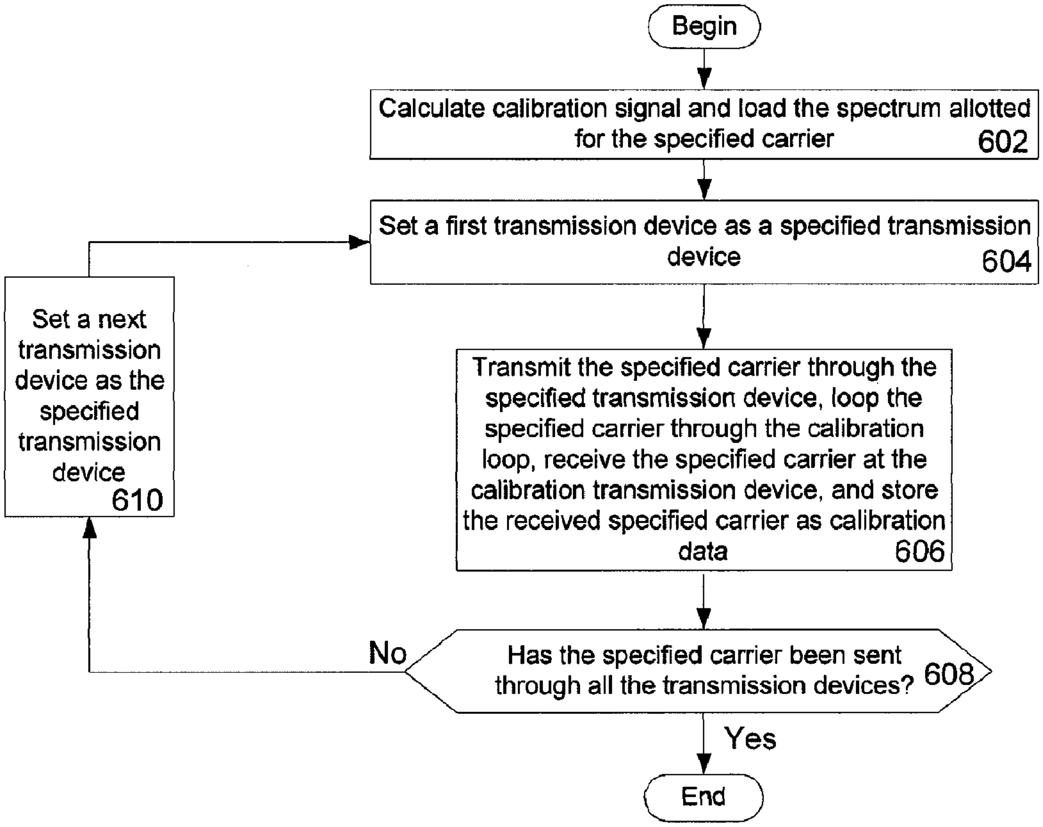
FIG. 6 is a flowchart illustrating a method of obtaining calibration data from a transmission device when a carrier corresponds to a downlink carrier.

FIG. 6 is a flowchart illustrating a method of obtaining calibration data from a transmission device when a carrier is a downlink carrier corresponding to step 506 of FIG. 5.

In Step 602, a calibration signal comprising a pair of calibration tones is calculated and inserted in the spectrum between the edges of the specified carrier bandwidth and the channel bandwidth as discussed above in reference to FIG. 4.

In Step 604, one of the transmission devices 108 is set as a specified transmission device.

In Step 606, the specified carrier and the calibration signal are summed, transmitted through the Tx path of the specified transmission device, and looped back to the Rx path of the calibration transmission device 110. A signal is captured at the Rx path of the calibration transmission device 110 containing the specified carrier, the calibration signal, and an amount of noise. A Hamming window is applied to the captured signal to reduce the amount of spectral leakage caused by the specified carrier, and a Fast Fourier Transform ("FFT") is taken of the captured signal and stored as calibration data for the specified transmission device; Equation (7) illustrates the application of a Hamming window and a FFT to the captured signal.

$$fftcapturedsignal(n) = FFT\left\{\left(0.54 - 0.46\cos\left(\frac{2\pi n}{N}\right)\right)\cdot capturedsignal(n)\right\} \qquad \text{Equation (7)}$$

The FFT transformed captured signal comprises a left index ($k_L$) and a right index ($k_R$) corresponding the pair of calibration tones of the calibration signal. Normalized calibration tones are determined for the specified transmission device by dividing captured calibration tones from a reference transmission device by the captured calibration tones for the specified transmission device; any of the transmission devices 108 may serve as the reference transmission device. A calibration weight for the specified transmission device is determined by taking the average of the normalized calibration tones.

At Step 608, the method checks to see if the summed specified carrier and calibration signal have been sent through all the transmission devices 108. If not, in Step 610, a next transmission device is set as the specified transmission device and the method returns to Step 604. Otherwise, the method proceeds to Step 510 in FIG. 5.

Figure 7:
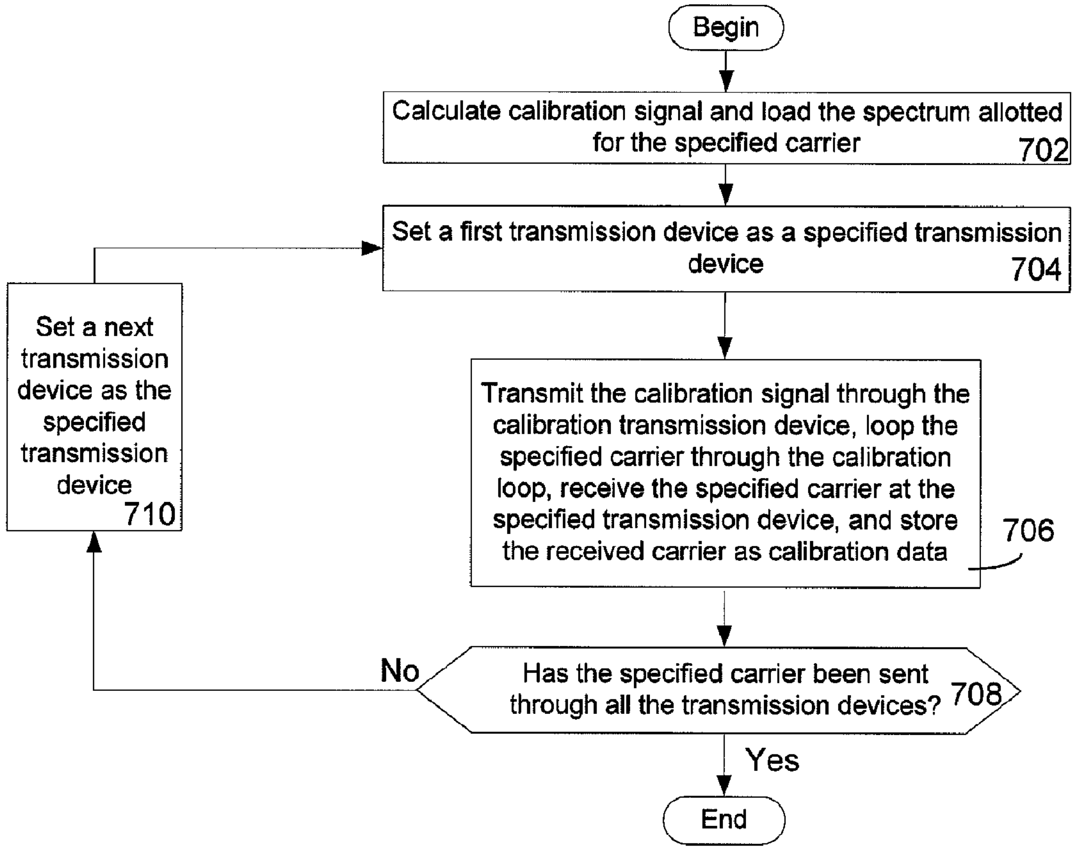
FIG. 7 is a flowchart illustrating a method of obtaining calibration data from a transmission device when a carrier corresponds to an uplink carrier.

FIG. 7 is a flowchart illustrating a method of obtaining calibration data from a transmission device when a carrier is an uplink carrier corresponding to step 508 of FIG. 5.

In Step 702, a calibration signal comprising a pair of calibration tones is calculated and inserted in the spectrum between the edges of the specified carrier bandwidth and the channel bandwidth as discussed above in reference to FIG. 4.

In Step 704, one of the transmission devices 108 is set as a specified transmission device.

In Step 706, the calibration signal is transmitted through the Tx path of the calibration transmission device 110 and looped back to the Rx path of the specified transmission device. A signal is captured at the Rx path of the specified transmission device containing the specified carrier, the calibration signal, and an amount of noise. A Hamming window is applied to the captured signal to reduce the amount of spectral leakage caused by the specified carrier, and a Fast Fourier Transform ("FFT") is taken of the captured signal; Equation (7) illustrates the application of a Hamming window and a FFT to the captured signal.

$$fftcapturedsignal(n) = FFT\left\{\left(0.54 - 0.46\cos\left(\frac{2\pi n}{N}\right)\right)\cdot capturedsignal(n)\right\} \quad \text{Equation (7)}$$

The FFT transformed captured signal comprises a left index ($k_L$) and a right index ($k_R$) corresponding the pair of calibration tones of the calibration signal. Normalized calibration tones are determined for the specified transmission device by dividing captured calibration tones from a reference transmission device by the captured calibration tones for the specified transmission device; any of the transmission devices 108 may serve as the reference transmission device. A calibration weight for the specified transmission device is determined by taking the average of the normalized calibration tones.

At Step 708, the method checks to see if the summed specified carrier and calibration signal have been sent through all the transmission devices 108. If not, in Step 710, a next transmission device is set as the specified transmission device and the method returns to Step 704. Otherwise, the method proceeds to Step 510 in FIG. 5.

Figure 8:
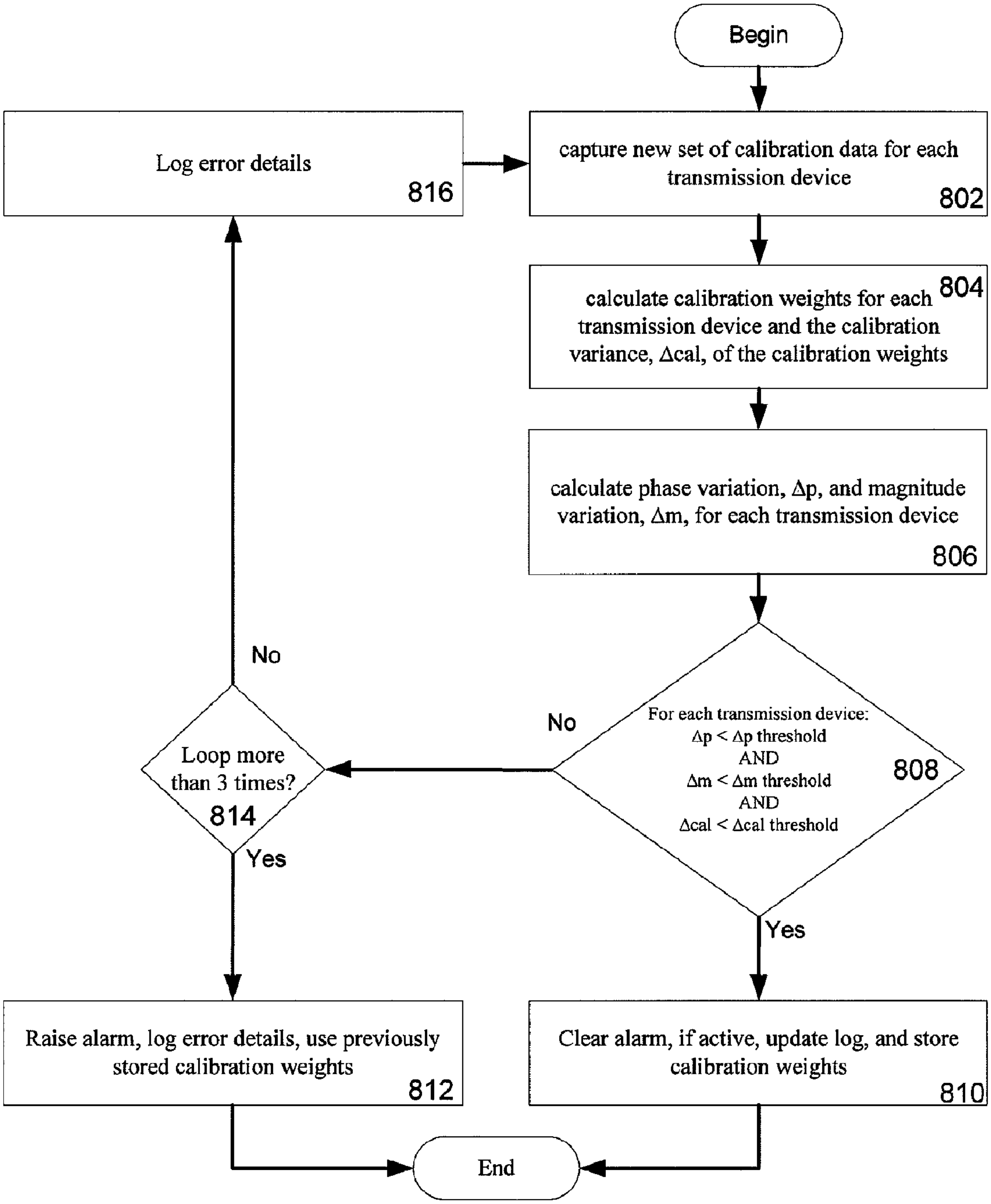
FIG. 8 is a flowchart illustrating a method of calibrating signal processing paths in accordance with an embodiment of the present invention.

Referring now to FIG. 8, FIG. 8 is a flowchart illustrating a method of calibrating signal processing paths according to one embodiment of the present invention.

In Step 802, a new set of calibration data is obtained for each of the transmission devices 108 for a given carrier as described in above in reference to FIGS. 5-7. The set of calibration data for each of the transmission devices includes a left index ($k_L$) and a right index ($k_R$) corresponding the pair of calibration tones of the calibration signal. Normalized calibration tones are determined for the specified transmission device by dividing captured calibration tones from a reference transmission device by the captured calibration tones for the specified transmission device; any of the transmission devices 108 may serve as the reference transmission device.

In Step 804, calibration weights are calculated for each of the transmission devices 108 and a calibration variance, Δcal, is determined for the calibration weights across all the transmission devices 108. A calibration weight for a given transmission device is determined by taking the average of the normalized calibration tones for that transmission device. The calibration variance is the variation of the calibration weights across all the transmission devices 108 calculated in dB.

In Step 806, a phase variation, Δp, and a magnitude variation, Δm, of the calibration data are calculated for each of the transmission devices 108. The phase variation, Δp, is the variation in phase of the left index calibration tone, $cal_i k_L$, and the right index calibration tone, $cal_i k_R$ and is illustrated in Equation (8).

$$\Delta p = \left|\frac{180}{\pi}\cdot\arcsin\left\{\frac{\mathrm{Im}(cal_i(k_L))\cdot\mathrm{Re}(cal_i(k_R)) - \mathrm{Re}(cal_i(k_L))\cdot\mathrm{Im}(cal_i(k_R))}{(|cal_i(k_L)|\cdot|cal_i(k_R)|)}\right\}\right| \quad \text{Equation (8)}$$

The magnitude variation, Δm, is the variation of the absolute values of the left index calibration tone, $cal_i k_L$, and the right index calibration tone, $cal_i k_R$ and is illustrated in Equation (9).

$$\Delta m = \left|20\cdot\log_{10}\left(\frac{cal_i(k_L)}{cal_i(k_R)}\right)\right| \quad \text{Equation (9)}$$

In Step 808, the calibration variance is compared to a calibration variance threshold, and, for each of the transmission devices 108, the phase variation is compared to a phase variation threshold and the magnitude variation is compared to a magnitude variation threshold. If the calibration variance is below the calibration variance threshold, and, for each of the transmission devices 108, the phase variation is below the phase variation threshold and the magnitude variation is below the magnitude variation threshold, then the method proceeds to Step 810; if not, the method proceeds to Step 814. Examples of threshold values include a phase variation threshold of 5 degrees, a magnitude variation threshold of 0.5 dB, and a calibration variance threshold of 1 dB. Note that, however, the present invention is not limited to these values and other threshold values may be used based on the specific needs of a system.

In Step 810, any active alarms are cleared, a log is updated, and the calibration weights are stored in the calibration unit 116. In Step 814, it is checked if the process flow has been looped more than 3 times. If the process has not been looped more than 3 times, the method proceeds to Step 816 and error details are logged before proceeding back to Step 802. If the process has been looped more than 3 times, the method proceeds to Step 812, at which an alarm is activated, the error details are logged, and previously determined calibration weights stored in the calibration unit 116 are used by the system.

Figure 9:
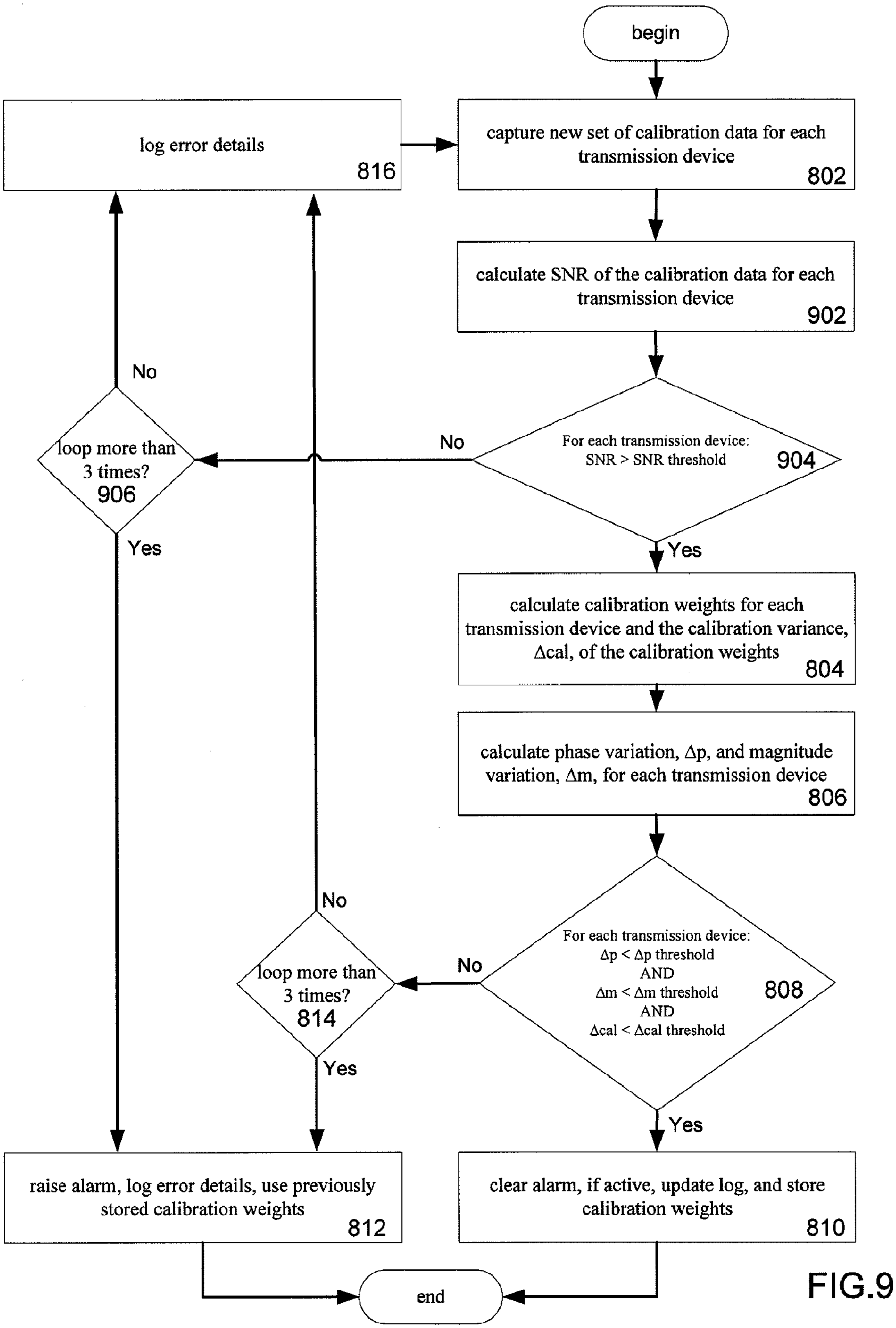
FIG. 9 is a flowchart illustrating a method of calibrating signal processing paths in accordance with an embodiment of the present invention.

Referring now to FIG. 9, FIG. 9 is a flowchart illustrating a method of calibrating signal processing paths according to a second embodiment of the present invention. More specifically, FIG. 9 illustrates an embodiment in which a signal-to-noise ratio ("SNR") is calculated and used to determine if the received calibration data is of good quality. For example, in order to achieve a +/− 1 deg accuracy on the calibration results, the SNR should be at least 35 dB.

It should be noted that the method of calibration of FIG. 9 is similar to the method of calibration of FIG. 8 except the method of calibration of FIG. 9 includes additional steps of calculation of the SNR of the received calibration data, and comparison of the SNR to a predetermined threshold to determine if the received calibration data is of good quality. Identical steps described above in reference to FIG. 9 will not be described below.

In Step 902, the SNR is calculated for each of the transmission devices 108. Equation (10) is used to calculate the SNR of the received calibration data, where $k_{NL}$, and $k_{NR}$ are determined by Equation (11) and Equation (12), respectively.

$$SNR = 10\cdot\log_{10}\left(\frac{|fftcapturedsignal(k_L)|^2 + |fftcapturedsignal(k_R)|^2}{|fftcapturedsignal(k_{NL})|^2 + |fftcapturedsignal(k_{NR})|^2} - 1\right) \quad \text{Equation (10)}$$

$$k_{NL} = \text{round}\left\{\left(f_c - \frac{BW_{channel}}{2}\right)\cdot\frac{N}{f_s}\right\} \quad \text{Equation (11)}$$

$$k_{NR} = \text{round}\left\{\left(f_c + \frac{BW_{channel}}{2}\right)\cdot\frac{N}{f_s}\right\} \quad \text{Equation (12)}$$

In Step 904, for each transmission of the devices 108, the SNR is compared to a SNR threshold. As noted above, ideally the SNR should be greater than 35 dB to judge that the received calibration data is of good quality, therefore the SNR threshold is set to 35 dB. Please note, however, that while 35 dB is used as the SNR threshold, the present invention is not limited to these values and other threshold values may be used to determine if the received calibration data is of good quality based on the specific needs of a system.

If, for each of the transmission devices 108, the SNR is greater than the SNR threshold, the received calibration data is judged to be of good quality and the method proceeds to Step 804. However, if the received calibration data is not judged to be of good quality, the method proceeds to Step 906.

In Step 906, it is checked if the process flow has been looped more than 3 times. If the process has not been looped more than 3 times, the method proceeds to Step 816 and error details are logged before proceeding back to Step 802. If the process has been looped more than 3 times, the method proceeds to Step 812 at which an alarm is activated, the error details are logged, and previously determined calibration weights are applied to the signal processing paths.

Figure 10:
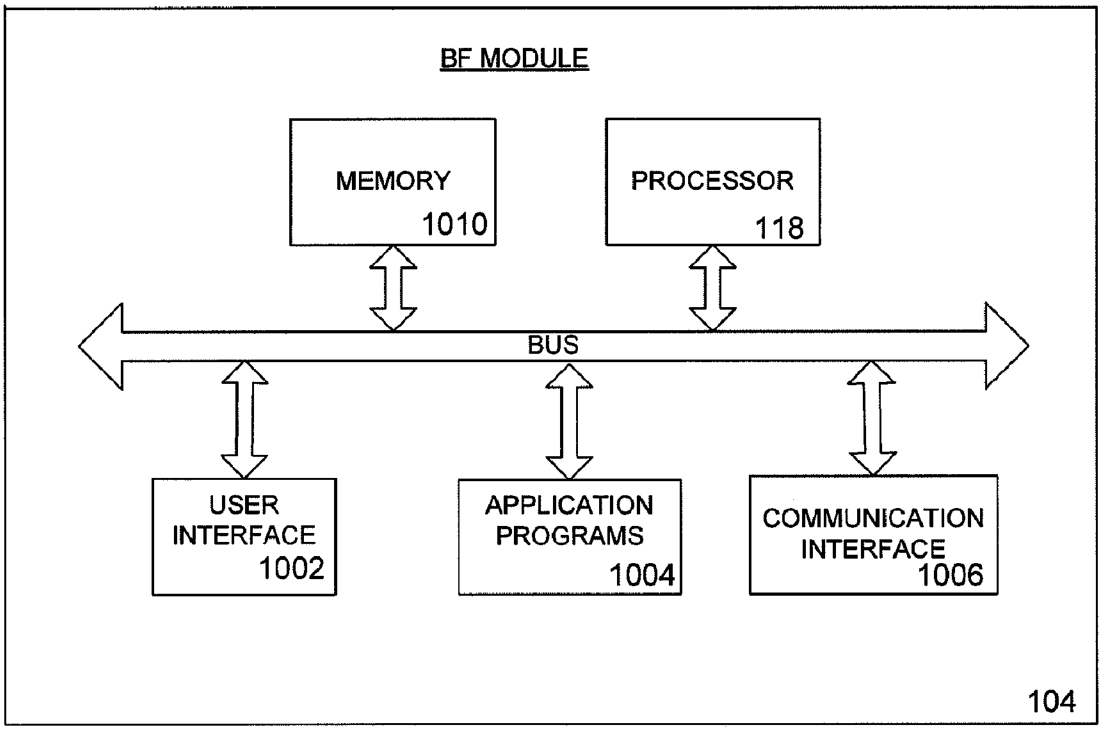
FIG. 10 is a representative beamforming module for calibrating multiple signal processing networks as shown in the system of FIG. 1.

FIG. 10 is a representative BF module 104 for calibrating multiple signal processing paths as shown in the system of FIG. 1. In FIG. 10, the BF module 104 includes a memory 1010, a processor 118, user interface 1002, application programs 1004, communication interface 1006 and bus 1008.

The memory 1010 can be computer-readable media used to store executable instructions, computer programs, algorithms or the like thereon. The memory 1010 may include a read-only memory (ROM), random access memory (RAM), programmable read-only memory (PROM), erasable programmable read-only memory (EPROM), a smart card, a subscriber identity module (SIM), or any other medium from which a computing device can read executable instructions or a computer program. The term "computer programs" is intended to encompass an executable program that exists permanently or temporarily on any computer-readable medium. The instructions, computer programs and algorithms stored in the memory 1010 cause the BF module 104 to perform calibrating multiple signal processing paths as described in the system of FIG. 1. The instructions, computer programs and algorithms stored in the memory 1010 are executable by one or more processors 118, which may be facilitated by one or more of the application programs 1004.

The application programs 1004 may also include, but are not limited to, an operating system or any special computer program that manages the relationship between application software and any suitable variety of hardware that helps to make-up a computer system or computing environment of the BF module 104. General communication between the components in the BF module 104 is provided via the bus 1008.

The user interface 1002 allows for interaction between a user and the BF module 104. The user interface 1002 may include a keypad, a keyboard, microphone, and/or speakers. The communication interface 1006 provides for two-way data communications from the BF module 104. By way of example, the communication interface 1006 may be a digital subscriber line (DSL) card or modem, an integrated services digital network (ISDN) card, a cable modem, or a telephone modem to provide a data communication connection to a corresponding type of telephone line. As another example, communication interface 1006 may be a local area network (LAN) card (e.g., for Ethernet™ or an Asynchronous Transfer Model (ATM) network) to provide a data communication connection to a compatible LAN.

Further, the communication interface 1006 may also include peripheral interface devices, such as a Universal Serial Bus (USB) interface, a Personal Computer Memory Card International Association (PCMCIA) interface, and the like. The communication interface 1006 also allows the exchange of information across one or more wireless communication networks. Such networks may include cellular or short-range, such as IEEE 802.11 wireless local area networks (WLANS). And, the exchange of information may involve the transmission of radio frequency (FR) signals through an antenna (not shown).

Further, the above disclosure defines the signal processing paths as being the Tx or Rx path of a transmission device. It is noted that the present invention is not limited to such disclosure and the above disclosure may be easily modified to work in a system containing signal processing paths consisting of an electrical/electronic/optical measurements system that allows an information/measurement signal with or without modulating a carrier to be processed through it.

While an embodiment of the invention has been disclosed, numerous modifications and changes will occur to those skilled in the art to which this invention pertains. The claims annexed to and forming a part of this specification are intended to cover all such embodiments and changes as fall within the true spirit and scope of the present invention.

The invention claimed is:

1. A method, comprising:

obtaining calibration data for a plurality of signal processing paths each associated with a transmission device from a plurality of transmission devices;

determining a plurality of calibration weights from the calibration data;

calculating a calibration variance between the plurality of calibration weights and determining if the calibration variance is below a calibration variance threshold;

calculating a phase variation and a magnitude variation from the calibration data for each signal processing path from the plurality of signal processing paths;

determining if the phase variation is below a phase variation threshold and if the magnitude variation is below a magnitude variation threshold for each signal processing path from of the plurality of signal processing paths; and applying a calibration weight from the plurality of calibration weights to a signal processing path from the plurality of signal processing paths when the calibration variance is below the calibration variance threshold, the phase variation associated with that signal processing path is below the phase variation threshold and the magnitude variation associated with that signal processing path is below the magnitude variation threshold.

2. The method of claim 1, further comprising:

calculating a signal-to-noise ratio of the calibration data for each of the plurality of signal processing paths; and determining if the signal-to-noise ratio of the calibration data is below a signal-to-noise ratio threshold for each of the plurality of signal processing paths, if the signal-to-noise ratio of the calibration data for any of the plurality of signal processing paths is below the signal-to-noise ratio threshold then the calibration data being discarded, and new calibration data being obtained for the plurality of signal processing paths.

3. The method of claim 1, wherein the obtaining of the calibration data includes inserting a calibration signal into a spectrum allotted to a carrier.

4. The method of claim 3, wherein the inserting of the calibration signal into the spectrum allotted to the carrier includes inserting the calibration signal in a spectrum between edges of a bandwidth of the carrier and a channel bandwidth of the spectrum allotted for the carrier.

5. The method of claim 3, wherein if the carrier is an uplink carrier, (i) transmitting the calibration signal through a transmission path of a calibration transmission device, (ii) looping the calibration signal and the carrier to a receiver path of one of the plurality of transmission devices, (iii) receiving the calibration signal and the carrier from the one of the plurality of transmission devices, and (iv) storing the received calibration signal and the carrier as the calibration data.

6. The method of claim 3, wherein if the carrier is a downlink carrier, (i) transmitting the calibration signal and the carrier through a transmission path of one of the plurality of transmission devices, (ii) looping the calibration signal and the carrier to a receiver path of a calibration transmission device, (iii) receiving the calibration signal and the carrier from the calibration transmission device, and (iv) storing the received calibration signal and the carrier as the calibration data.

7. The method of claim 1, further comprising:

determining a beamforming weight for each of the plurality of transmission devices by multiplying an ideal beamforming weight by the calibration weight for the signal processing path associated with each of the plurality of transmission devices; and applying the beamforming weight for each of the plurality of transmission devices to the signal processing path associated with each of the plurality of transmission devices and from the plurality of signal processing paths.

8. A system, comprising:

a calibration unit configured to obtain calibration data for a plurality of signal processing paths each associated with a transmission device from a plurality of transmission devices;

a calibration weight determination unit configured to determine a plurality of calibration weights from the calibration data;

a variance calculation unit configured to calculate a calibration variance between the plurality of calibration weights, and configured to calculate a phase variation and a magnitude variation from the calibration data for each signal processing path from the plurality of signal processing paths; and a threshold determination unit configured to determine if the calibration variance is below a calibration variance threshold, and configured to determine if the phase variation for a signal processing path from the plurality of signal processing paths is below a phase variation threshold and if the magnitude variation for the signal processing path is below a magnitude variation threshold, a calibration weight from the plurality of calibration weights being applied to the signal processing path from the plurality of signal processing paths if the calibration variance is below the calibration variance threshold, and the phase variation for the signal processing path is below the phase variation threshold, and the magnitude variation for the signal processing path is below the magnitude variation threshold.

9. The system of claim 8, further comprising:

a signal-to-noise ratio calculating unit configured to calculate a signal-to-noise ratio of the calibration data for each of the plurality of signal processing paths, and configured to determine if the signal-to-noise ratio of the calibration data is below a signal-to-noise ratio threshold for each of the plurality of signal processing paths, if the signal-to-noise ratio of the calibration data for any of the plurality of signal processing paths is below the signal-to-noise ratio threshold then the calibration data being discarded, and new calibration data being obtained for the plurality of signal processing paths.

10. The system of claim 8, wherein the calibration unit is configured to insert a calibration signal into a spectrum allotted to a carrier.

11. The system of claim 10, wherein the calibration unit is configured to insert the calibration signal in a spectrum between edges of a bandwidth of the carrier and a channel bandwidth of the spectrum allotted for the carrier.

12. The system of claim 10, further comprising a calibration transmission device having a receiver path, the at least one of the signal processing paths for each of the plurality of transmission devices including a transmission path, if the carrier is a downlink carrier, the calibration unit configured to obtain the calibration data from the receiver path of the calibration transmission device for each of the plurality of transmission devices by:

(i) transmitting the calibration signal and the carrier through the transmission path of one of the plurality of transmission devices;

(ii) looping the calibration signal and the carrier to the receiver path of the calibration transmission device;

(iii) receiving the calibration signal and the carrier from the calibration transmission device; and (iv) storing the received calibration signal and the carrier as the calibration data.

13. The system of claim 10, further comprising a calibration transmission device having a transmitter path, and the at least one of the signal processing paths for each of the plurality of transmission devices including a receiver path, and if the carrier is an uplink carrier, the calibration unit configured to obtain the calibration data from the receiver path for each of the plurality of transmission devices by:

(i) transmitting the calibration signal through the transmitter path of the calibration transmission device;

(ii) looping the calibration signal and the carrier to the receiver path of one of the transmission devices;

(iii) receiving the calibration signal and the carrier from the one of the plurality of transmission devices; and (iv) storing the received calibration signal and the carrier as the calibration data.

14. The system of claim 8, further comprising:

a beamforming weight determination unit configured to determine a beamforming weight for each of the plurality of transmission devices by multiplying an ideal beamforming weight by the calibration weight for the signal processing path associated with each of the plurality of transmission devices, and configured to apply the beamforming weight for each of the plurality of transmission devices to the signal processing path associated with each of the plurality of transmission devices.

15. A non-transitory computer readable storage medium having a program stored thereon that when executed causes a computer to perform a method, comprising:

obtaining calibration data for a plurality of signal processing paths each associated with a transmission device from a plurality of transmission devices;

determining a plurality of calibration weights from the calibration data;

calculating a calibration variance between the plurality of calibration weights and determining if the calibration variance is below a calibration variance threshold;

calculating a phase variation and a magnitude variation from the calibration data for each signal processing path from the plurality of signal processing paths;

determining if the phase variation is below a phase variation threshold and if the magnitude variation is below a magnitude variation threshold for each signal processing path from of the plurality of signal processing paths; and applying a calibration weight from the plurality of calibration weights to a signal processing path from the plurality of signal processing paths when the calibration variance is below the calibration variance threshold, the phase variation associated with that signal processing path is below the phase variation threshold and the magnitude variation associated with the at least one signal processing path is below the magnitude variation threshold.

16. The non-transitory computer readable storage medium of claim 15, further comprising:

calculating a signal-to-noise ratio of the calibration data for each of the plurality of signal processing paths; and determining if the signal-to-noise ratio of the calibration data is below a signal-to-noise ratio threshold for each of the plurality of signal processing paths, if the signal-to-noise ratio of the calibration data for any of the plurality of signal processing paths is below the signal-to-noise ratio threshold then the calibration data being discarded, and new calibration data being obtained for the plurality of signal processing paths.

17. The non-transitory computer readable storage medium of claim 15, wherein the obtaining of the calibration data includes inserting a calibration signal into a spectrum allotted to a carrier.

18. The non-transitory computer readable storage medium of claim 17, wherein the inserting of the calibration signal into the spectrum allotted to the carrier includes inserting the calibration signal in a spectrum between edges of a bandwidth of the carrier and a channel bandwidth of the spectrum allotted for the carrier.

19. The non-transitory computer readable storage medium of claim 17, wherein if the carrier is an uplink carrier:

(i) transmitting the calibration signal through a transmission path of a calibration transmission device;

(ii) looping the calibration signal and the carrier to a receiver path of one of the plurality of transmission devices;

(iii) receiving the calibration signal and the carrier from the one of the plurality of transmission devices; and (iv) storing the received calibration signal and the carrier as the calibration data, and wherein if the carrier is a downlink carrier:

(i) transmitting the calibration signal and the carrier through a transmission path of one of the plurality of transmission devices;

(ii) looping the calibration signal and the carrier to a receiver path of a calibration transmission device;

(iii) receiving the carrier from the calibration transmission device; and (iv) storing the received calibration signal and the carrier as the calibration data.

20. The non-transitory computer readable storage medium of claim 15, further comprising:

determining a beamforming weight for each of the plurality of transmission devices by multiplying an ideal beamforming weight by the calibration weight for the signal processing path associated with each of the plurality of transmission devices; and applying the beamforming weight for each of the plurality of transmission devices to the signal processing path associated with each of the plurality of transmission devices and from the plurality of signal processing paths.

* * * * *